United States Patent [19]

Stobbie, IV et al.

[11] Patent Number: 5,436,302

[45] Date of Patent: Jul. 25, 1995

[54] MIXTURE OF ISOCYANATE-TERMINATED POLYURETHANE PREPOLYMERS

[75] Inventors: Charles W. Stobbie, IV, Maplewood; John C. Tangen, Lake Elmo; Lani S. Kangas, Woodbury, all of Minn.

[73] Assignee: Minnesota Mining and Manufacturing Company, St. Paul, Minn.

[21] Appl. No.: 258,611

[22] Filed: Jun. 10, 1994

Related U.S. Application Data

[63] Continuation of Ser. No. 54,460, Apr. 27, 1993, abandoned, which is a continuation of Ser. No. 515,113, Apr. 27, 1990, abandoned.

[51] Int. Cl.$^6$ .................... C08L 75/06; C08L 75/08
[52] U.S. Cl. .................... 525/458; 525/440; 525/447; 528/40; 528/59; 528/67; 428/349; 428/423.1
[58] Field of Search .......... 525/440, 451, 458; 528/40, 59, 67

[56] References Cited

U.S. PATENT DOCUMENTS

| | | | |
|---|---|---|---|
| 3,919,173 | 11/1975 | Coyner et al. | 528/58 |
| 3,931,077 | 1/1976 | Uchigaki et al. | |
| 4,059,715 | 11/1977 | Pletcher | 428/349 |
| 4,092,202 | 5/1978 | Bergk et al. | 156/331 |
| 4,182,898 | 1/1980 | Fujiwara et al. | 528/60 |
| 4,352,858 | 10/1982 | Stanley | 428/423.1 |
| 4,357,441 | 11/1982 | Hammera et al. | 524/391 |
| 4,546,167 | 10/1985 | Chang | 528/44 |
| 4,585,819 | 4/1986 | Reischle et al. | 524/196 |
| 4,588,802 | 5/1986 | Chang | 528/44 |
| 4,661,542 | 4/1987 | Gilch et al. | 528/59 |
| 4,786,703 | 11/1988 | Starner et al. | 528/63 |
| 5,137,984 | 8/1992 | Kangas et al. | 525/411 |
| 5,173,538 | 12/1992 | Gilch et al. | 525/130 |

FOREIGN PATENT DOCUMENTS

| | | |
|---|---|---|
| 53378/86 | 8/1986 | Australia . |
| 55264/86 | 10/1986 | Australia . |
| 0081103 | 6/1983 | European Pat. Off. . |
| 0081693 | 6/1983 | European Pat. Off. . |
| 0340906 | 11/1989 | European Pat. Off. . |
| 0392171 | 10/1990 | European Pat. Off. . |
| 2021603 | 12/1979 | United Kingdom . |
| 2137638 | 10/1984 | United Kingdom . |

OTHER PUBLICATIONS

"Tire Sealants" *Chemical Abstracts*, Nov., 1977, vol. 87, No. 20, p. 50, #87:153227a.
"Insulation Coatings" *Chemical Abstracts*, Aug. 1986, vol. 105, No. 8, pp. 100–101, #105:62382W.
"Urethane Epoxy Resins" *Chemical Abstracts*, Jun. 1986, vol. 104, No. 24, p. 39, #104:208244f.

*Primary Examiner*—Thomas Hamilton, III
*Attorney, Agent, or Firm*—Gary L. Griswold; Walter N. Kirn; Steven E. Skolnick

[57] ABSTRACT

A blend of isocyanate-terminated polyurethane prepolymers is provided. The blend consists essentially of a first crystalline prepolymer based upon polyhexamethylene adipate and a second prepolymer based upon polytetramethylene ether glycol.

19 Claims, No Drawings

MIXTURE OF ISOCYANATE-TERMINATED POLYURETHANE PREPOLYMERS

This is a continuation of application Ser. No. 08/054,460 filed Apr. 27, 1993, now abandoned, which is a continuation of application Ser. No. 07/515,113 filed Apr. 27, 1990, now abandoned.

FIELD OF THE INVENTION

This invention relates to mixtures of isocyanate-terminated polyurethane. It further relates to the use of such mixtures as adhesives, coatings and sealants.

BACKGROUND

Isocyanate-terminated, polyurethane prepolymers (sometimes referred to hereinafter as polyurethane prepolymers) are desirable in a variety of applications. For example, they can be used in reactive hot melt urethane adhesive, coating and/or sealant systems. These hot melt urethane systems are solid at room temperature, melt to a viscous liquid when heated to moderate temperatures (82°–121° C.), and are applied in a molten state. They then cool to a solid state to provide initial bond strength (that is, "green strength"), and, additionally, cure on contact with ambient moisture to provide their final bond strength.

A number of reactive urethane hot melt compositions are known. For example, U.S. Pat. No. 3,931,077 discloses a reactive hot melt composition comprising (a) a urethane prepolymer prepared from a diol selected from ethylene glycol, propylene glycol, 1,4-butanediol, 1,4-butinediol (sic), polymers thereof, and polytetramethylene glycolether (sic), (b) a thermoplastic resin of an ethylene-vinyl copolymer, an ethylene-acrylic acid copolymer, an ethylene-acrylate copolymer, an atactic polypropylene or a poly(ethyleneterephthalate) linear polymer, and (c) a tackifier.

U.S. Pat. No. 4,352,858 discloses a modified polyurethane adhesive composition comprising an isocyanate-terminated prepolymer and a dicarbamate ester which is compatible with the prepolymer and which contains two free isocyanate groups.

U.K. Patent No. 2,137,638 discloses a urethane hot melt adhesive composition which comprises a moisture-curable polyurethane formed from a diisocyanate, a substantially linear hydroxy polyester, and a monofunctional reactant present in an amount sufficient to react with up to 40 mole percent of the isocyanate groups of the product of the prepolymer reaction.

U.S. Pat. No. 4,585,819 discloses a polyurethane hot melt composition which comprises an isocyanate prepolymer, a thermoplastic polyurethane or polyester and/or a low molecular weight synthetic resin selected from the group consisting of ketone resins, hydrogenation products of acetophenone condensation resins, and mixtures thereof.

European Patent Application Publication No. 0 340 906 discloses a hot melt polyurethane adhesive composition which comprises a mixture of at least two amorphous polyurethane prepolymers characterized in that each prepolymer provides a different glass transition point to the composition.

U.S. patent application Ser. No. 07/201,169, now abandoned discloses polyurethane hot melt adhesives, coatings and sealant systems which employ mixtures of isocyanate-terminated polyurethane prepolymers prepared from hydroxy-functional polyesters. These mixtures do not, however, encompass the mixtures of the present invention. Moreover, the mixtures of the present invention provide better adhesion to a variety of substrates, including certain plastic substrates, than do those of the pending application.

The compositions of the invention are an improvement over these prior compositions in that they achieve adhesion to substrates even though they are 100% reactive systems. Thus, while various adjuvants can be added to the compositions of the invention, their addition is unnecessary to the attainment of adhesion.

SUMMARY OF THE INVENTION

It has now been discovered that a blend or mixture of (a) a first crystalline polyurethane prepolymer based upon a polyhexamethylene adipate and (b) a second polyurethane prepolymer based upon a polytetramethylene ether glycol, provides outstanding adhesion to a variety of surfaces including polymeric surfaces. Examples of substrates to which the compositions of the invention have adhesion include polymers such as polystyrene, polycarbonate, polyvinyl chloride, acrylnitrile/butadiene/styrene terpolymers, polyester, polymethylmethacrylate, fiber-reinforced plastic, polymer foams, corona-treated or primed polyethylene and polypropylene, etc.; wood, paper, leather, rubber, textiles, non-woven materials, and bare and painted metals.

While prior hot melt systems provide adhesion to a variety of surfaces, it has been discovered that the blend of the invention provides excellent adhesion to polystyrene and polymethylmethacrylate, substrates to which prior hot melt systems have not provided adequate, if any, adhesion. It has also been discovered that the blend of the invention provides this adhesion when used alone or in combination with other ingredients.

In accordance with the present invention, there is provided a mixture or blend of isocyanate-terminated polyurethane prepolymers which consist essentially of
  (a) from 10 to 90 parts by weight of a first polyurethane prepolymer which comprises the reaction product of a polyhexamethylene adipate (sometimes referred to hereinafter as PHA) having a number average molecular weight (sometimes referred to hereinafter as Mn) of at least 2,400 with a polyisocyanate, and
  (b) correspondingly from 90 to 10 parts by weight of a second polyurethane prepolymer which comprises the reaction product of a polytetramethylene ether glycol (sometimes referred to hereinafter as THF) having a Mn of at least 500 with a polyisocyanate, wherein the mixture provides an isocyanate group-to-hydroxyl group ratio of greater than 1.

As noted, the blend of the invention may be used alone or in combination with other ingredients. Thus, for example, one or more additional reactive components such as one or more other isocyanate-terminated polyurethane prepolymers may be used in combination with the blend of the invention. Typically, these other reactive components may comprise up to 60 weight percent of the total composition. Preferably, they comprise from 5 to 50 weight percent of the total composition.

Preferred compositions of the invention provide an adhesion to polystyrene (sometimes referred to hereinafter as plastic adhesion value) of at least 3.5 kilonewtons per meter width (kN/m width). The plastic adhesion value is determined using a modified version of ASTM D 903. The procedure for determining plastic adhesion value is set out below in the examples.

Preferred compositions of the invention also exhibit excellent green strength build-up. That is, these compositions can support a 4.5 kilogram tensile load for at least 120 seconds within five minutes of making a bond. Still further, preferred compositions of the invention consistently wet substrates to which they are applied and, when tested for adhesion, exhibit essentially no "zip" or "chatter." Zip or chatter indicates that the adhesive did not wet at least some portions of one of the substrates to which it is applied. As used herein, "zip" or "chatter" refers to the property of an adhesive bond to exhibit no peel strength over certain portions of a bonded area when tested for the plastic adhesion value according to the procedures described herein.

DETAILED DESCRIPTION OF THE INVENTION

The blends or mixtures of the present invention consist essentially of from 10 to 90 parts by weight of the first prepolymer and correspondingly from 90 to 10 parts by weight of the second prepolymer. Preferably, the blends or mixtures consist essentially of from 10 to 80 parts by weight of the first prepolymer and, correspondingly, from 90 to 20 parts by weight of the second prepolymer. More preferably, the mixtures consist essentially of from 30 to 60 parts by weight of the first prepolymer and, correspondingly, from 70 to 40 parts by weight of the second prepolymer. Preferably, the blends exhibit no zip or chatter, and exhibit a green strength build-up of, at most, 5 minutes.

The prepolymers useful herein may be prepared by techniques that are well known in the art. For example, prepolymers suitable in the invention may be formed by reaction of a mixture of the hydroxy-functional polymers and the polyisocyanate in a suitable vessel. Alternatively, the prepolymers may be prepared by reacting each of the hydroxy-functional polymers separately with the polyisocyanate followed by blending of the resultant prepolymers. Still further, the prepolymers may be prepared by forming one prepolymer and subsequently forming the other prepolymer or prepolymers in the first.

Typically, the components are mixed at an elevated temperature, using conventional mixing techniques. It is preferred to mix the components under anhydrous conditions. Generally, the prepolymers are prepared without the use of solvents.

In any case, the isocyanate equivalents should be present in the reaction mixture in an amount greater than that of the hydroxyl equivalents. The equivalent ratio of isocyanate-to-hydroxyl (sometimes referred to hereinafter as the isocyanate index) is preferably from about 1.2/1 to about 10/1 and especially preferably from about 1.6/1 to 2.2/1.

The first and second prepolymers are derived from a polyhexamethylene adipate (PHA) (preferably 1,6-polyhexamethylene adipate) and polytetramethylene ether glycol (THF), respectively. While Mn of these materials is at least 2,750 and 500, respectively, it is preferred that the Mn of each be higher. It has been discovered that the performance characteristics of the blend or mixture may be enhanced by increasing Mn of either or both of the materials. Thus, for example, when a PHA of Mn equal to 2,400 is employed to make the first prepolymer, a THF of Mn equal to at least 2,250 is employed to make the second prepolymer. When the Mn of the PHA is increased to at least 3,000, a THF with an Mn of 1,000 can be used. When Mn of the PHA is 4,500, a THF of Mn of 750 can be employed.

It should also be noted that combinations of two or more PHAs and/or two or more THFs may be used in the preparation of the first and second prepolymers.

PHA typically comprises the reaction product of 1,6-hexanediol and adipic acid, while THF typically is produced by the cationic polymerization of tetrahydrofuran. However, other monomer materials may also be included in the polymerization mixture so as to incorporate them into the resultant polyol. Such modified PHAs or THFs are included within the scope of materials useful in preparing the first and second prepolymers. Examples of such other monomer materials which may be used to modify PHA include neopentyl glycol, ethylene glycol, butanediol, succinic acid, sebacic acid, etc. An example of another monomer which may be used to modify THF is ethylene oxide. The exact level of "other monomer" utilized is not critical to the invention provided it does not negatively affect adhesion. Typically, the other monomers comprise up to 50 mole percent of the polymerization mixture.

It has also been discovered that the crystallinity of the THF is not critical to the invention. Thus, this material may be amorphous, partially crystalline, or substantially crystalline.

Examples of commercially available PHAs useful in this invention include "Lexorez" 1130-30P from Inolex Chemical Co., "Rucoflex" 105-37 from Ruco Polymer Corporation, and "Formrez" 66-20 from Witco Chemical Company.

Examples of commercially available THFs useful in this invention include "Polymeg" 2000 from Q O Chemical, Inc., the "Terathane" series of THFs from DuPont, and "PolyTHF" from BASF Corporation.

The third polyurethane prepolymer is derived from a hydroxy-functional polymer other than PHA or THF. This prepolymer may be added for a variety of purposes such as adjusting the set time, green strength build-up, tack, final strength, etc. of the resultant mixture. Moreover, the third prepolymer may be a single prepolymer or it may be a combination of two or more prepolymers, if desired, to achieve a specific result.

The Mn of the hydroxy-functional polymers used to make the third prepolymer is not critical to the invention. Thus, a wide range of Mn hydroxy-functional polymers may be employed. Examples of useful hydroxy-function polymers in preparing the third prepolymer include polyester (including polylactone) polyols, polyalkylene or polyalkylene ether polyols, polyacetal polyols, polyamide polyols, polyesteramide polyols, polythioether polyols, etc.

Examples of commercially available polyols useful in preparing the third prepolymer are "Dynacoll" 7380 (a polyester polyol, Mn of 3,740, hydroxyl number of 30, available from Hüls America), "Dynacoll" 7130 (a polyester polyol, Mn 3,740, hydroxyl number of 30, available from Hüls America), and "Lexorez" 3500-30P (a polyester polyol, Mn 3,740, hydroxyl number of 30, available from Inolex Chemical Co.).

Polyisocyanates which can be reacted with the hyrdoxy-functional polymers to form the prepolymers used in the instant invention may be aliphatic or aromatic. Preferably, they are aromatic diisocyanates such as diphenylmethane-2,4'-diisocyanate and/or 4,4'-diisocyanate; tolylene-2,4-diisocyanate and -2,6-diisocyanate and mixtures thereof. Other examples include: naphthylene-1,5-diisocyanate; triphenylmethane-4,4'4''-triisocyanate; phenylene-1,3-diisocyanate and -1,4-diisocyanate; dimethyl-3,3'-biphenylene-4,4'-diisocyanate; diphenylisopropylidine-4,4'-diisocyanate; biphenylene diisocyanate; xylylene-1,3-diisocyanate and xylylene-1,4-diisocyanate.

A list of useful commercially available polyisocyanates is found in the *Encyclopedia of Chemical Technology*, Kirk-Othmer, 2nd Ed., Vol. 12, pp. 46–47, Interscience Pub., N.Y. (1967), which is incorporated herein by reference. Especially preferable isocyanates include diphenylmethane-4,4'-diisocyanate (MDI) and its isomers and mixtures thereof.

Isocyanate-functional derivative(s) of MDI and TDI may be used, such as liquid mixtures of the isocyanate-functional derivative with melting point modifiers (e.g., mixtures of MDI with polycarbodiimide adducts such as "Isonate 143L", commercially available from Dow Chemical Company); small amounts of polymeric diphenylmethane diisocyanates, preferably 10% or less by weight of the total isocyanate components, (e.g., "PAPI", and the series "PAPI 20", commercially available from Dow Chemical Company, the "Mondur" series of isocyanates commercially available from Mobay Chemical Corp., and "Rubinate M", commercially available from ICI Chemicals, Inc.); and blocked isocyanate compounds formed by reacting aromatic isocyanates or the above-described isocyanate-functional derivatives with blocking agents such as ketoximes and the like. Such blocked isocyanate-functional derivatives will, for convenience, be regarded herein as isocyanate-functional derivatives of MDI and TDI.

It is preferred that the first and second prepolymers used in the present invention be somewhat incompatible with one another.

Even though the first and second prepolymers are preferably incompatible, the resultant blend typically does not exhibit macroscopic phasing. Phasing of the blends of the prepolymers can be detected in a number of ways. For example, blends which phase demonstrate inconsistent green strength build-up (i.e., good build-up sometimes and poor build-up other times) even though the same composition has been used. Moreover, blends which phase may also exhibit inconsistent plastic adhesion values.

In addition to the third prepolymer, other ingredients or adjuvants can be employed with the mixtures of the invention to impart or modify particular characteristics to the composition. They should be added only at a level that does not interfere with the adhesion characteristics of the composition. These adjuvants may comprise up to 50 weight percent of the composition either individually or in combination. For example, chain-extension agents (e.g., short chain polyols such as ethylene glycol or butanediol) fillers (e.g., carbon black; glass, ceramic, metal or plastic bubbles; metal oxides such as zinc oxide; and minerals such as talc, clays, silica, silicates, and the like), thermoplastic resins, plasticizers, antioxidants, pigments, U.V. absorbers, adhesion promoters such as silanes, and the like may be included to modify set time, green strength, build-up, tack, flexibility, etc.

In addition, the compositions of the invention may include an effective amount of catalyst or reaction accelerator such as tertiary amines, metal-organic compounds, co-curatives, and the like. An effective amount of a catalyst is preferably from about 0.01 to 2 percent by weight of the total prepolymer weight. More preferably, the catalyst is present at a level of about 0.05 to about 0.5 percent, based on the total weight of the prepolymer employed.

The compositions of the invention achieve their initial, or green strength through crystallization, then continue to cure by exposure to water, e.g., water vapor or moisture. High humidity and heat will provide an accelerated rate of cure while low humidity (e.g., 15% R.H. or less) will provide a slower rate of cure.

While the composition of the invention is preferably essentially non-phasing, some separation of the prepolymer components is acceptable. Moreover, the degree of phasing can be adjusted by varying any, or several, of certain factors. For example, the degree of chain extension of the prepolymers, the molecular weight of the hydroxy-functional polymers employed and the choice of isocyanate all influence phase separation. For example, as the molecular weight of the PHA decreases, the compatability of the blend increases. Additionally, as the isocyanate index ratio decreases, the compatability of the prepolymer components increases. Moreover, simply varying the ratios of the prepolymer components influences their compatability. Typically, the mixtures of the invention are slightly hazy to translucent. Thus, while they are not clear, they do allow light to pass through them when in the molten state.

The following examples are offered to aid understanding of the present invention and are not to be construed as limiting the scope thereof. All parts are by weight unless otherwise stated.

General Preparation of the Isocyanate-Terminated Polyurethane Prepolymers 4,4'-Diphenylmethane diisocyanate (MDI) was added to a 600 ml, stainless steel reactor fitted with a gas inlet adapter and a cover having a rubber gasket, gas inlet, stirrer opening and stirring rod. The MDI was heated to 100° C. and melted with efficient stirring under a nitrogen blanket. After the MDI melted, polytetramethylene ether glycol (THF) was added to the reactor. The mixture was stirred under nitrogen for about 15 minutes. The polyhexamethylene adipate (PHA) was then added to the reactor. Stirring and heating were continued for about 15 minutes, and then 4,4'-(Oxydi-2,1-ethanediyl) bismorpholine ("Thancat" DMDEE, Texaco Chemical Co.) was added. Stirring was continued under vacuum for about 1 hour. Heating at 100° C. was maintained throughout. The resulting mixture was poured into nitrogen purged metal containers and sealed. The containers were stored in a dessicator.

The reaction between the MDI and each of the THF and PHA was essentially complete. A minor amount of unreacted ingredients remained, typically less than 3 percent by weight.

EXAMPLES 1–18

A series of isocyanate-terminated polyurethane prepolymers were made as described in the General Preparation. Each of the resulting compositions was tested for plastics adhesion using a modified version of ASTM D 903. Each blend was individually extruded at 107° C. onto the center portion of a 2.5 cm wide by 10 cm long ×0.3 cm thick piece of isopropanol wiped rigid polystyrene (Huntsman grade 730). Immediately, a 3.8 cm wide ×28.5 cm long piece of canvas was bonded to the polystyrene using a press at 0.7 MPa for 10 seconds. This was sufficient pressure to force the blend to cover the entire bond area and squeeze excess composition out of the edges of the bond area. The bonded substrates were then conditioned at 25° C. and 50% relative humidity for 7 days. The canvas was then trimmed to 2.5 cm width, and the resulting test coupons were tested using an Instron tensile tester at a crosshead speed of 5 cm per minute. Plastic adhesion values were measured as the average of high and low readings of four coupons. The compositions of Examples 1–4, 11, 14–15 and 17 exhibited some zip. In these examples, the plastic adhesion value was the average of the high and low value for those portions of the bond that did not zip.

Tables 1–3 report the measured plastic adhesion values. In these tables, the reference to all concentrations of the prepolymers are in parts by weight. All concentrations of DMD are as a percentage by weight of the total weight of the prepolymers.

Table 2 shows the effect of varying the Mn of the THF employed.

Table 3 shows the effect of varying the Mn of the PHA employed.

Specifically, with reference to Table 1, the data show that the blend of the invention (Examples 2–7 and 9–11) has dramatically improved adhesion to plastic over either the use of prepolymers prepared from a polyisocyanate and either PHA or THF alone. Compare, for example, the plastics adhesion value of Example 1 with that of Example 2. The addition of a mere 10% of the second prepolymer to the first prepolymer increases the plastic adhesion value by over 68%. Likewise, comparison of Example 7 with Example 8 shows that addition of 20% of the first prepolymer to the second prepolymer increases the plastic adhesion value by over 2.7 times.

Examples 3–6 and 9–10 further show that the plastic adhesion value is significantly greater over the range of mixtures claimed.

Examples 9–10 also show that the plastic adhesion value remains high even when the isocyanate index is increased.

The data in Table 2 show that increasing the Mn of the THF utilized does not negatively affect the plastic adhesion value. That is, even the lowest plastic adhesion value is significantly higher than that of either of Examples 1 or 8. Furthermore, these values are consistent with those reported in Table 1 for Examples 5 and 9–10.

The data in Table 3 show that increasing the Mn of the PHA does not negatively affect the plastic adhesion value. That is, even the lowest plastic adhesion value is significantly higher than that of either of Examples 1 or 8. Furthermore, these values are also consistent with those reported in Table 1 for Examples 5 and 9–10 and in Table 2.

TABLE 2

|  | 11 | 12 | 13 | 14 | 15 | 16 |
|---|---|---|---|---|---|---|
| First Prepolymer |  |  |  |  |  |  |
| (1) | 0.6 | 0.6 | 0.6 |  |  |  |
| (2) |  |  |  | 0.6 | 0.6 | 0.6 |
| Second Prepolymer |  |  |  |  |  |  |
| (3) | 0.4 |  |  |  |  |  |
| (4) |  | 0.4 |  | 0.4 |  |  |
| (5) |  |  |  |  | 0.4 |  |
| (6) |  |  | 0.4 |  |  | 0.4 |
| DMD | 0.2 | 0.2 | 0.2 | 0.2 | 0.2 | 0.2 |
| ISOCYANATE INDEX | 1.32 | 1.41 | 1.71 | 1.39 | 1.55 | 1.65 |
| PLASTIC ADHESION |  |  |  |  |  |  |
| lb/in width | 28.5 | 29 | 51.5 | 47.5 | 29.5 | 48 |
| kN/m width | 5 | 5.1 | 9 | 8.3 | 5.2 | 8.4 |
| Clarity | clear | slight haze | slight haze | slight haze | slight haze | slight haze |

(1)Prepared from 1,6-Polyhexamethylene adipate ("Lexorez" 1130-30P from Inolex Chemical Co. hydroxyl number of 33, Mn of 3417).
(2)Prepared from 1,6-Polyhexamethylene adipate ("Rucoflex" 105-37 from Ruco Polymer Corporation, hydroxyl number of 38, Mn of 2907).
(3)Prepared from Polytetramethylene ether glycol ("Terathane" 650 from DuPont, hydroxyl number of 167, Mn of 671).
(4)Prepared from Polytetramethylene ether glycol ("Terathane" 1000 from DuPont, hydroxyl number of 114, Mn of 988).
(5)Prepared from Polytetramethylene ether glycol ("Polymeg" 2000 from Q O Chemical Inc., hydroxyl number of 59, Mn of 1905).
(6)Prepared from Polytetramethylene ether glycol ("PolyTHF" from BASF Corporation, hydroxyl number of 39.5, Mn of 2841).

TABLE 3

|  | 17 | 18 |
|---|---|---|
| First Prepolymer |  |  |
| (1) | 0.6 |  |
| (2) |  | 0.6 |
| Second Prepolymer |  |  |
| (3) | 0.4 | 0.4 |
| DMD | 0.2 | 0.2 |
| ISOCYANATE INDEX | 1.55 | 1.69 |
| PLASTIC ADHESION |  |  |
| lb/in width | 29.5 | 53 |
| kN/m width | 5.2 | 9.3 |
| Clarity | slight haze | slight haze |

(1)Prepared from 1,6-Polyhexamethylene adipate ("Rucoflex" 105-37 from Ruco Polymer Corporation, hydroxyl number of 38, Mn of 2907).
(2)Prepared from 1,6-Polyhexamethylene adipate ("Formrez" 66-20 from Witco Chemical Company, hydroxyl number of 22, Mn of 5048).
(3)Prepared from Polytetramethylene ether glycol ("Polymeg" 2000 from Q O Chemical, Inc., hydroxyl number of 59, Mn of 1905).

After being tested for plastic adhesion, the canvas was visually inspected for zip. The results of this visual inspection are reported below in Table 4 where the percent non-wetted area indicates zip. Thus, the greater the percentage, the greater the zip.

TABLE 1

|  | 1 | 2 | 3 | 4 | 5 | 6 | 7 | 8 | 9 | 10 |
|---|---|---|---|---|---|---|---|---|---|---|
| 1st Prepolymer(1) | 1 | 0.9 | 0.8 | 0.7 | 0.6 | 0.4 | 0.2 | 0 | 0.6 | 0.6 |
| 2nd Prepolymer(2) | 0 | 0.1 | 0.2 | 0.3 | 0.4 | 0.6 | 0.8 | 1 | 0.4 | 0.4 |
| DMD(3) | 0.2 | 0.2 | 0.2 | 0.2 | 0.2 | 0.2 | 0.2 | 0.2 | 0.2 | 0.2 |
| ISOCYANATE INDEX | 1.78 | 1.73 | 1.68 | 1.64 | 1.6 | 1.54 | 1.49 | 1.45 | 1.8 | 2.0 |
| PLASTIC ADHESION |  |  |  |  |  |  |  |  |  |  |
| lb/in width | 18 | 31 | 45 | 43 | 44.5 | 32 | 22 | 8 | 45 | 42.5 |
| kN/m width | 3.2 | 5.4 | 7.9 | 7.5 | 7.8 | 5.6 | 3.8 | 1.4 | 7.9 | 7.4 |
| Clarity | clear | slight haze | slight haze | slight haze | slight haze | slight haze | slight haze | clear | slight haze | slight haze |

(1)Prepared from 1,6-Polyhexamethylene adipate ("Lexorez" 1130-30P from Inolex Chemical Co., hydroxyl number of 33, Mn of 3417).
(2)Prepared from Polytetramethylene ether glycol ("Polymeg" 2000 from Q O Chemical, Inc., hydroxyl number of 59, Mn of 1905).
(3)4,4'-(Oxydi-2,1-ethanediyl) bismorpholine ("Thancat" DMDEE from Texaco Chemical Company).

TABLE 4

| Ex | 1st Prepolymer/ 2nd Prepolymer (parts by weight) | MnPHA/MnTHF (number average) | Non-wetted Area (%) |
|---|---|---|---|
| 1  | 1/0     | 3417/1905 | 30% |
| 2  | 0.9/0.1 | 3417/1905 | 50 |
| 3  | 0.8/0.2 | 3417/1905 | 25 |
| 4  | 0.7/0.3 | 3417/1905 | 14 |
| 5  | 0.6/0.4 | 3417/1905 | 0 |
| 6  | 0.4/0.6 | 3417/1905 | 0 |
| 7  | 0.2/0.8 | 3417/1905 | 0 |
| 8  | 0/1     | 3417/1905 | 0 |
| 9  | 0.6/0.4 | 3417/1905 | 0 |
| 10 | 0.6/0.4 | 3417/1905 | 0 |
| 11 | 0.6/0.4 | 3417/671  | 50 |
| 12 | 0.6/0.4 | 3417/988  | 5 |
| 13 | 0.6/0.4 | 3417/2841 | 0 |
| 14 | 0.6/0.4 | 2907/988  | 20 |
| 15 | 0.6/0.4 | 2907/1905 | 30 |
| 16 | 0.6/0.4 | 2907/2841 | 0 |
| 17 | 0.6/0.4 | 2907/1905 | 30 |
| 18 | 0.6/0.4 | 5048/1905 | 0 |

The data shows the great ability to reduce the percent of non-wetted area by changing the Mn of either or both of the PHA and THF used to make the first and second prepolymers used in the mixture. Thus, at a given Mn for either component, increasing the Mn of the other generally reduces the non-wetted area. Examples 14 and 15 have essentially equivalent non-wetted areas.

The compositions of Examples 1–18 were also tested to determine their green strength build-up. This property was measured as follows. A $0.5 + 0.05$ g quantity of the composition was extruded at 107° C. onto the center portion (about 5 cm from each end) of a 2.5 cm wide $\times 10$ cm long $\times 0.8$ cm thick piece of Douglas Fir. A timer was started. After 10 seconds, a second piece of Fir was bonded on its center point and at right angles to the first. Firm hand pressure was used to mate the surfaces and squeeze excess composition from the bond line. At various intervals, a 4.5 kg tensile load was pneumatically applied to the 6.45 sq cm bond area. The length of time that was required for the bond to support the 4.5 kg load for at least 120 seconds was then recorded as the green strength build-up. Longer times indicate poorer green strength build-up.

The results of these tests are reported in Table 6.

TABLE 6

| Ex | 1st Prepolymer/ 2nd Prepolymer (parts by weight) | MnPHA/MnTHF (number average) | Green Strength Build-Up (min) |
|---|---|---|---|
| 1  | 1/0     | 3417/1905 | 1.3 |
| 2  | 0.9/0.1 | 3417/1905 | 1.4 |
| 3  | 0.8/0.2 | 3417/1905 | 1.4 |
| 4  | 0.7/0.3 | 3417/1905 | 1.5 |
| 5  | 0.6/0.4 | 3417/1905 | 2.1 |
| 6  | 0.4/0.6 | 3417/1905 | 3.6 |
| 7  | 0.2/0.8 | 3417/1905 | 6.1 |
| 8  | 0/1     | 3417/1905 | >10 |
| 9  | 0.6/0.4 | 3417/1905 | 2.8 |
| 10 | 0.6/0.4 | 3417/1905 | 2.9 |
| 11 | 0.6/0.4 | 3417/671  | 6.9 |
| 12 | 0.6/0.4 | 3417/988  | 3.5 |
| 13 | 0.6/0.4 | 3417/2841 | 1.4 |
| 14 | 0.6/0.4 | 2907/988  | 5.8 |
| 15 | 0.6/0.4 | 2907/1905 | 2.4 |
| 16 | 0.6/0.4 | 2907/2841 | 1.9 |
| 17 | 0.6/0.4 | 2907/1905 | 2.4 |
| 18 | 0.6/0.4 | 5048/1905 | 1.4 |

This data show that increasing the Mn of the THF or the PHA alone, or increasing the Mn of both PHA and THF at the same time, improves the green strength build-up of the composition. The data also show that varying the weight ratio of the first prepolymer to the second prepolymer affects green strength build-up.

EXAMPLES 19–25

The blend of Example 18 was tested for adhesion to various substrates according to the procedure described above for determining plastic adhesion except that the type of substrate was varied. The results of these tests are set forth in Table 7.

TABLE 7

| | | Adhesion | |
|---|---|---|---|
| Ex | Substrate | lb/in width | kN/m width |
| 19 | Polycarbonate (isopropanol wiped) | 60+ | 10.5+ |
| 20 | Fiber reinforced plastic (methyl ethyl ketone wiped) | 60+ | 10.5+ |
| 22 | Abraded Polyvinylchloride | 61 | 10.7 |
| 22 | Acrylonitrile/Butadiene/ Styrene terpolymer (isopropanol wiped) | 60+ | 10.5+ |
| 23 | Polymethylmethacrylate (isopropanol wiped) | 76 | 13.3 |
| 24 | Polystyrene (isopropanol wiped) | 57 | 10 |
| 25 | Abraded Cold Rolled Steel (isopropanol wiped) | 63 | 11 |

These bonds each exhibited 100% bonding (0% unbonded area). The "+" signifies that the canvas tore before the bond failed totally.

EXAMPLES 26–28

Compositions according to the invention were prepared which employed a third prepolymer. The general preparation was employed as set forth above except that after the PHA had been reacted with the MDI, the polyol employed for the third prepolymer was charged to the reactor.

The resulting compositions were then tested for plastic adhesion as described in Examples 1–18. Table 9 reports the results of these tests. The references to concentrations of prepolymers are in parts by weight.

The reference to DMD is in percentage by weight of the total weight of the prepolymers.

TABLE 9

| | 26 | 27 | 28 |
|---|---|---|---|
| First Prepolymer | | | |
| (1) | 60 | 50 | |
| (2) | | | 55 |
| Second Prepolymer | | | |
| (3) | 30 | 30 | 15 |
| Third Prepolymer | | | |
| (4) | 10 | 20 | |
| (5) | | | 20 |
| (6) | | | 10 |
| DMD (7) | 0.2 | 0.2 | 0.2 |
| PLASTIC ADHESION | | | |
| lb/in width | 67 | 63 | 47 |

TABLE 9-continued

|  | 26 | 27 | 28 |
|---|---|---|---|
| kN/m width | 11.9 | 11.2 | 7.5 |

(1) Prepared from 1,6-Polyhexamethylene adipate ("Formez" 66-20 from Witco Chemical Co., hydroxyl number of 38, Mn of 2907).
(2) Prepared from 1,6-Polyhexamethylene adipate ("Lexorez" 1130-1p from Inolex Chemical Co., hydroxyl number of 33, Mn of 3417).
(3) Prepared from Polytetramethylene ether glycol ("Polymeg" 2000 from Q O Chemical, Inc., hydroxyl number of 59, Mn of 1905).
(4) Prepared from a polyester polyol ("Dynacoll" 7380 from Hüls America, hydroxyl number of 30, Mn of 3740).
(5) Prepared from a polyester polyol ("Lexorez" 3500-30P from Inolex Chemical Co., hydroxyl number of 30, Mn of 3740).
(6) Prepared from a polyester polyol ("Dynacoll" 7130 from Hüls America, hydroxyl number of 30, Mn of 3740).
(7) 4,4'-(Oxydi-2,1-ethanediyl) bismorpholine ("Thancat" DMDEE from Texaco Chemical Company).

COMPARATIVE EXAMPLE

The adhesion of the blend of Example 18 to rigid polystyrene was compared to that of a variety of commercially available moisture curing hot melt adhesives. The adhesion test was performed as described above for determining plastic adhesion except that the type of composition varied. The results of these tests are set forth in Table 8.

TABLE 8

| Composition | Adhesion lb/in width | kN/m width |
|---|---|---|
| Ex. 18 | 57 | 10 |
| "JET-WELD" 3876 from 3M Co. | 0 | 0 |
| "SUPERGRIP" 9601 from Bostik-Tucker GmbH | 0 | 0 |
| "SUPERGRIP" 9704 from Bostik-Tucker GmbH | 0 | 0 |
| "CURATHANE" 140A from Swift Adhesives | 0 | 0 |
| "HQR" 3450 from Henkel Corp. | 0 | 0 |

We claim:

1. A moisture curable hot-melt adhesive, coating and/or sealant composition comprising: (a) from 10 to 90 parts by weight of a first isocyanate-terminated, crystalline polyurethane prepolymer comprising the reaction product of a polyhexamethylene adipate (PHA) having a number average molecular weight (Mn) of at least 2,400, with an aromatic polyisocyanate, and (b) correspondingly from 90 to 10 parts by weight of a second isocyanate-terminated polyurethane prepolymer comprising the reaction product of a polytetramethylene ether glycol (THF) having a number average molecular weight (Mn) of at least 500 with an aromatic polyisocyanate,
wherein the composition has an isocyanate group-to-hydroxyl group ratio greater than 1.

2. A moisture curable, hot-melt adhesive coating and/or sealant composition according to claim 1 wherein said PHA has an Mn of at least 2,400 and said THF has an Mn of at least 2,250.

3. A moisture curable, hot-melt adhesive coating and/or sealant composition according to claim 1 wherein said PHA has an Mn of at least 3,000 and said THF has an Mn of at least 1,000.

4. A moisture curable, hot-melt adhesive coating and/or sealant composition according to claim 1 wherein said PHA has an Mn of at least 4,500 and said THF has an Mn of 750.

5. A moisture curable, hot-melt adhesive coating and/or sealant composition according to claim 1 comprising from 10 to 80 parts by weight of said first prepolymer and correspondingly from 90 to 20 parts by weight of said second prepolymer.

6. A moisture curable, hot-melt adhesive coating and/or sealant composition according to claim 5 comprising from 10 to 60 parts by weight of said first prepolymer and correspondingly from 90 to 40 parts by weight of said second prepolymer.

7. A moisture curable, hot-melt adhesive coating and/or sealant composition according to claim 1 having a plastic adhesion value of at least 3.5 kilonewtons per meter of width.

8. A moisture curable, hot-melt adhesive coating and/or sealant composition according to claim 1 having a green strength build-up of about 5 minutes or less.

9. A moisture curable, hot-melt adhesive coating and/or sealant composition according to claim 1 having an isocyanate group-to-hydroxyl group ratio of from about 1.2:1 to 2.2:1.

10. A moisture curable, hot-melt adhesive coating and/or sealant composition according to claim 6 wherein said PHA has an Mn of at least 2,400 and said THF has an Mn of at least 2,250.

11. A moisture curable, hot-melt adhesive coating and/or sealant composition according to claim wherein said PHA has an Mn of at least 3,000 and said THF has an Mn of at least 1,000.

12. A moisture curable, hot-melt adhesive coating and/or sealant composition according to claim 6 wherein said PHA has an Mn of at least 4,500 and said THF has an Mn of at least 750.

13. A moisture curable, hot-melt adhesive coating and/or sealant composition according to claim 1 further comprising up to about 2 percent by weight of the combined weight of said first and second prepolymers of a catalyst.

14. A moisture curable, hot-melt adhesive coating and/or sealant composition according to claim 1 wherein said first and second prepolymers are non-phasing.

15. An article comprising a first substrate bearing a layer of said moisture curable, hot-melt adhesive coating and/or sealant composition according to claim 1 thereon.

16. An article according to claim 15 further comprising a second substrate bonded to said first substrate by means of said moisture curable, hot-melt adhesive coating and/or sealant composition.

17. A shaped article comprising the moisture curable, hot-melt adhesive coating and/or sealant composition of claim 1.

18. A container of the moisture curable, hot-melt adhesive coating and/or sealant composition of claim 1.

19. An article according to claim 15 wherein said substrate is polymeric.

* * * * *

UNITED STATES PATENT AND TRADEMARK OFFICE
CERTIFICATE OF CORRECTION

PATENT NO. : 5,436,302

DATED : July 25, 1995

INVENTOR(S) : Charles W. Stobbie IV, John C. Tangen and Lani S. Kangas

It is certified that error appears in the above-indentified patent and that said Letters Patent is hereby corrected as shown below:

Col. 12, line 31, "6" should be added after "claim".

Signed and Sealed this

Fifteenth Day of October, 1996

Attest:

BRUCE LEHMAN

*Attesting Officer*         *Commissioner of Patents and Trademarks*